United States Patent [19]

Schloemann et al.

[11] 4,122,459
[45] Oct. 24, 1978

[54] INK FEED SYSTEM

[75] Inventors: Ernst F.R.A. Schloemann, Weston, Mass.; Fred M. Howell, Barrington, R.I.

[73] Assignee: Raytheon Company, Lexington, Mass.

[21] Appl. No.: 816,554

[22] Filed: Jul. 18, 1977

[51] Int. Cl.² ........................................... G01D 15/12
[52] U.S. Cl. ................................ 346/140 R; 101/336; 118/8; 324/229; 346/74.1; 400/119
[58] Field of Search ................ 346/140 R, 21, 74.1; 101/350, 336; 197/171; 118/7, 8, 9, 646, 257; 324/229

[56] References Cited

U.S. PATENT DOCUMENTS

| 3,377,598 | 4/1968 | Borman | 197/171 X |
| 3,382,796 | 5/1968 | Javorik | 118/646 X |
| 3,674,353 | 7/1972 | Trachtenberg | 118/8 |
| 3,719,261 | 3/1973 | Heinzer | 346/140 R X |

Primary Examiner—Joseph W. Hartary
Attorney, Agent, or Firm—David M. Warren; Milton D. Bartlett; Joseph D. Pannone

[57] ABSTRACT

An ink feed system for an electrophoretic printer wherein a ribbon is used to carry ink from an ink supply to the paper upon which it is applied by means of an electric field. A magnetic constituent is added to the ink and a magnetic field is impressed alongside the ribbon and parallel to the surface thereof. A Hall probe positioned in the magnetic field senses perturbations thereof perpendicular to the ribbon induced by the presence of ink on the ribbon. A signal produced by the Hall probe signals the density of the ink upon the ribbon and is utilized for regulating a flow of ink onto the ribbon.

7 Claims, 4 Drawing Figures

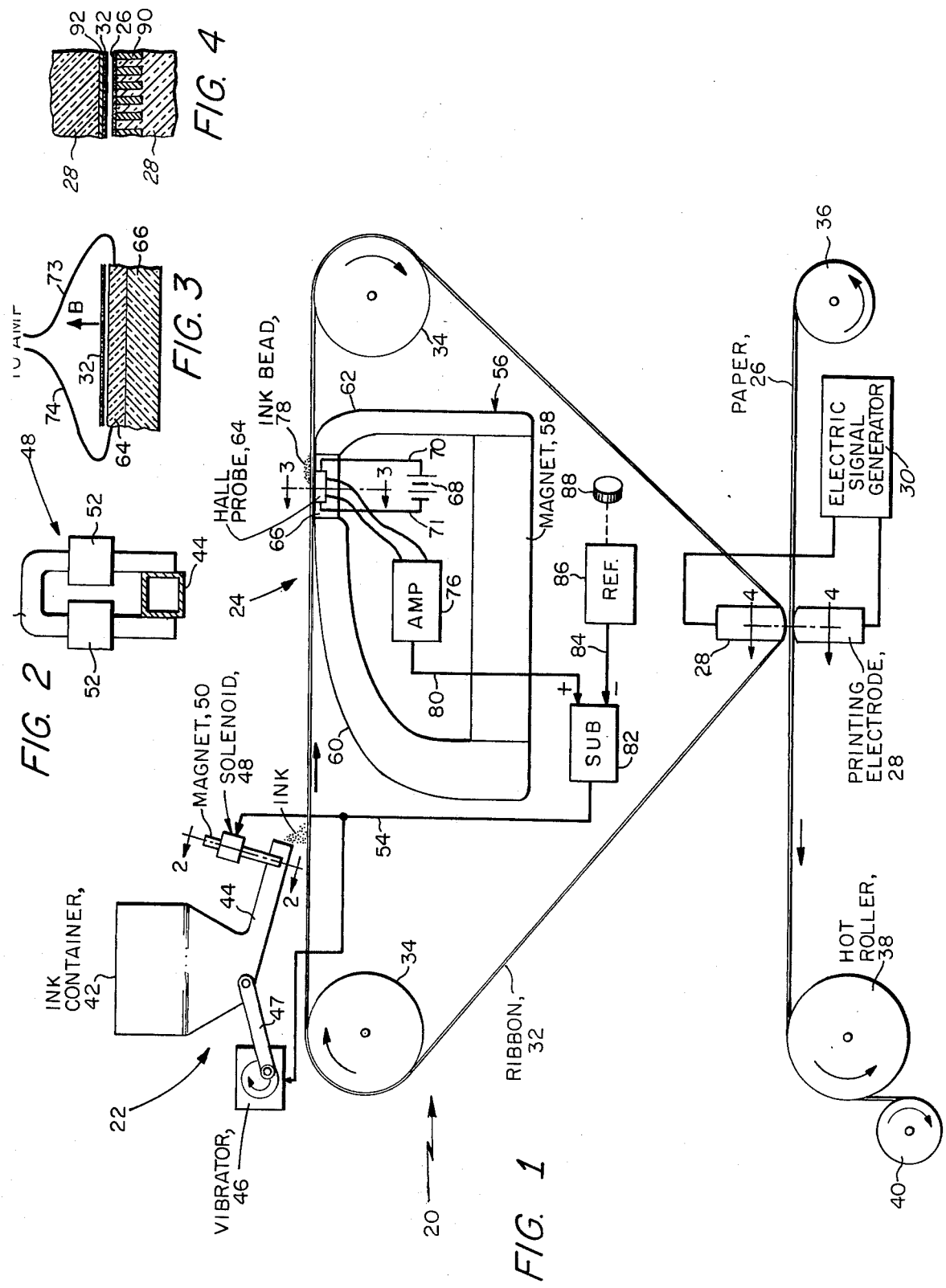

INK FEED SYSTEM

BACKGROUND OF THE INVENTION

Electrophoretic printing may be utilized with a group of electrodes in a printing apparatus for simultaneously imprinting a number of symbols or points upon a recording medium such as paper. Electrodes positioned adjacent the paper may be provided with specific shapes so that, upon the impressing of an electric field between the electrodes, electrically conductive particles of ink become attached to the paper with the particles of ink being arranged in accordance with the shapes of the individual electrodes. Thereby, a set of symbols may be simultaneously printed on paper. The ink is frequently carried to a location between the electrodes by means of a ribbon positioned adjacent the paper but spaced apart therefrom by a small distance on the order of the thickness of a few sheets of the paper.

A problem arises when the ink delivery by the ribbon is to be utilized for the imprinting of an image having various shades of gray in that the carbon particles utilized for producing the gray color, or black color, need be present on the ribbon with a prescribed density so that, upon the application of an electric field of a predetermined magnitude across the electrodes, a predetermined amount of the electrically conductive carbon is transferred by the electric field from the ribbon to paper. Indeed, for a precisely controlled gray scale of a printer or imaging system producing multiple shades of gray, a specific relationship is established between the magnitude of the electric field and the amount of carbon transferred from the ribbon to the paper. In the past, difficulties in the control of the gray scale have been apparent because of the lack of regulation of the density of the ink particles upon the ribbon. As a result, variations in the gray scale were obtained with variations in the density of the ink independently of the magnitude of the electric field.

SUMMARY OF THE INVENTION

The aforementioned problem is overcome and other advantages are provided by an ink feed system incorporating a magnet for magnetically positioning particles of ink on a ribbon, the system further incorporating a sensing device of magnetic fields such as a Hall probe which is positioned adjacent the ribbon for sensing a perturbation in the magnetic field induced by an accumulation of ink on the ribbon. The Hall probe senses a component of the perturbed magnetic field normal to a surface of the ribbon, the magnitude of a signal produced by the Hall probe being a measure of the density of the ink on the ribbon. The ink itself is preferably formed of a mixture of carbon particles and magnetic particles such as mangetite which are bound together by a thermoplastic material which melts upon the application of heat to the recording medium, such as paper, whereby the carbon particles are secured to the paper to form a permanent image.

In a preferred embodiment of the invention, the magnetic field is established alongside the ribbon which serves as a carrier of the ink particles, the magnetic vector lying in a plane parallel to a surface of the ribbon. As the ribbon with the ink particles thereon passes by the poles of the magnet, the magnetic constituent of the ink interacts with the magnetic field with the result that the particles of ink are drawn within the pores of the ribbon. In addition, it has been found that a quantity of ink accumulates along the downstream pole of the magnet and remains in the vicinity of that pole as the ribbon moves past the pole. The presence of the magnetic particles in the vicinity of the poles of the magnet and, in particular, the excess accumulation of the particles along the downstream pole, produce a perturbation in the magnetic field such that a component of the field perpendicular to the plane of the ribbon is produced. The Hall probe, which is in the form of a wafer lying in a plane parallel to the surface of the ribbon, produces a voltage in response to the pressure of the component of the perturbed magnetic field normal to the ribbon.

An ink supply having an exit port thereof in the form of a spout for delivery of the inke to a surface of the carrier, or ribbon, is mechanically coupled to a vibrator which produces vibrations in the spout to facilitate the sliding of the particles onto the ribbon. In addition, a variable magnetic field impressed across the spout is utilized for restricting the flow of ink particles onto the ribbon. A relatively strong magnetic field causes the particles to adhere together magnetically in the form of a block which is magnetically secured in the vicinity of the pole pieces at the spout. When the magnetic field is reduced in strength, the ink particles can again flow through the spout. A signal from the Hall probe activates the vibrator and also is coupled to a solenoid of the magnet at the exit port for varying the strength of the magnet to regulate the amount of ink on the ribbon in accordance with the amount of ink sensed by the Hall probe. The ribbon with the ink thereon passes between a set of printing electrodes along with the paper to permit the electric field between the electrodes to imprint an image on the paper. The carbon particles of the ink are sufficiently electrically conductive to permit their interaction with the electric field whereby they are transferred from the ribbon to the paper.

BRIEF DESCRIPTION OF THE DRAWINGS

The aforementioned features and other aspects of the invention are explained in the following description taken in connection with the accompanying drawings wherein:

FIG. 1 is a side elevation view, partially diagrammatic, of an electrophoretic printing system incorporating the ink feed and monitoring features of the invention;

FIG. 2 is an enlarged view of a magnet structure on the exit port of the ink container taken along the lines 2—2 of FIG. 1;

FIG. 3 is a sectional view taken along the lines 3—3 of FIG. 1 showing the Hall probe and a substrate for supporting the Hall probe in a gap within the magnet utilized for attaching the ink particles to the ribbon; and FIG. 4 is a sectional view taken along the lines 4—4 of FIG. 1 showing individual electrodes of the electrode structure wherein the carbon marks are imprinted on the paper by transferring the ink particles from the ribbon to the paper under the influence of an applied electric field.

DESCRIPTION OF THE PREFERRED EMBODIMENT

Referring now to FIG. 1, an ink feed system 20 incorporates a feeder 22 and a monitor 24 in accordance with the invention for regulating the density of ink presented to a recording medium such as a paper 26 as it passes between a pair of electrodes 28 whereby an electric field impressed by a signal generator 30 produces an image upon the paper 26. The ink includes a magnetic constituent such as magnetite particles along with particles of carbon which serve to blacken the paper 26, the carbon particles being electrically conductive so as to be lodged in intimate contact with the paper 26 unde the force of the electric field. The ink is in the form of particulate matter wherein each particle comprises both the aforementioned magnetite and carbon particles bound together by a thermoplastic material which melts upon the application of heat to the paper 26 for permanently securing the ink to the paper 26.

The ink is carried by a ribbon 32 which is driven and supported by rollers 34, the ribbon 32 being guided past and slidably contacting the upper one of the electrodes 28 while the paper 26 is guided by rollers 36, 38 and 40 past the lower electrode 28 adjacent to and spaced apart from the ribbon 32. The spacing between the ribbon 32 and the paper 26 in the vicinity of the electrodes 28 is on the order of a few thicknesses of the paper 26.

The feeder 22 comprises a bin 42, a spout 44 communicating with the lower portion of the bin 42, a vibrator 46 comprising a motor with an eccentric for imparting the vibratory motion via an arm 47 to the spout 44, and a solenoid assembly 48 which coacts with the magnetic constituent of the ink in the spout 44 to act as a valve for regulating the flow of ink from the spout 44 to the ribbon 32.

Referring also to FIG. 2, the solenoid assembly 48 comprises a permanent U-shaped magnet 50 the ends of which are contiguous to the walls of the spout 44, the legs of the magnet 50 having solenoids 52 thereon which, in response to an electrical signal on line 54, produce a magnetic field having the opposite sense to the permanent magnetic field of the magnet 50. Thus, in the absence of the electrical signal on line 54, the magnetic field of the magnet 50 passes through the spout 44 to magnetize the particles of the ink and thereby form a blockage of ink particles which restricts the flow of ink down the spout 44. In the presence of the electrical signal on line 54, the solenoids 52 are energized to produce a magnetic field of sufficient strength to neutralize the field of the magnet 50 whereby the blockage of the magnetized particles of the ink is dissipated to permit the flow of ink down the spout 44 to the ribbon 32. The signal on line 54 is also coupled to the vibrator 46 to activate the vibrator 46 to vibrate the spout 44 when the solenoids 52 are energized. Thereby, a supply of ink is held within the bin 42 and metered out to the ribbon 32 via the spout 44, vibrations of the spout 44 induced by the vibrator 46 facilitating the flow of the ink particles through the spout 44, and the solenoid assembly 48 regulating the rate at which ink is deposited on the ribbon 32.

The monitor 24 of FIG. 1 comprises a magnet assembly 56 which includes a permanent magnet 58 and pole pieces 60 and 62. A Hall probe 64 is supported within a nonmagnetic substrate 66, such as a substrate of glass or epoxy material, within the gap between the pole pieces 60 and 62. Referring also to the sectional view of FIG. 3, the Hall probe 64 extends across the width of the gap and comprises a semiconductor material which, in the presence of a magnetic field in a direction normal to a surface of the ribbon 32 as shown by the B vector, and in response to an electric field induced in the gap parallel to the plane of the ribbon and transversely of the ribbon by a battery 68 having leads 70–71 coupled to the probe 64, produces an apparent transverse electric field which is the Hall effect, the voltage thereof being communicated vai leads 73–74 to an amplifier 76.

The pole piece 60 is curved at its approach to the ribbon 32 to facilitate passage of the ribbon 32 in the direction of the motion arrow toward the gap between the pole pieces 60 and 62. The magnetic field at the gap is directed along lines substantially parallel to the plane of the ribbon 32. A slight spacing is provided between the ribbon 32 and the pole pieces 60 and 62 to prevent friction therebetween during the passage of the ribbon 32 by the pole pieces 60 and 62. Because of the proximity of the ribbon 32 to the pole pieces 60 and 62, a magnetic field of the gap propagates in part through the magnetic particles of the ink carried by the ribbon 32 and exerts a force on the ink particles which urges the ink particles into a more secure contact with the pores of the ribbon 32 so that these ink particles adhere to the ribbon 32. The slight deflection of the magnetic field from the pole piece 60 into the ribbon 32 and back into the pole piece 62 results in a relatively small component normal to the ribbon 32, parallel to the B vector of FIG. 3, in the region of the gap. The Hall probe 64 senses th B vector and transmits a signal along the leads 73–74 to the amplifier 76 which signals the magnitude of the B vector. It has been found that the motion of the ribbon 32 in combination with the forces of the magnetic field in the gap result in an accumulation of ink, shown as a bead 78 of ink adjacent the pole piece 62. The magnitude of the B vector increases with increasing size of the ink bead 78 on the ribbon 32. Thereby, the amplifier 76 receives a signal indicating the magnitude of the ink bead 78 which is an indication of density of ink on the ribbon 32.

The amplifier 76 amplifies the signal and couples the amplified signal via line 80 to a differential amplifier 82 wherein the signal in line 80 is compared to a reference signal on line 84. The reference signal on line 84 is conveniently provided by a voltage source 86 having a knob 88 thereon for adjusting the magnitude of the reference signal on line 84. The differential amplifier 82 subtracts the reference signal on line 84 from the Hall probe signal on line 80 to produce the aforementioned signal on line 54 which operates the vibrator 46 and the solenoid assembly 48. The use of the reference signal on line 84 provides a threshold effect which renders the solenoid assembly 48 responsive only to Hall probe signals above a preset amplitude. The gain of the amplifier 76 is adjusted to provide a desired feed rate to the ink particles in the spout 44 in accordance with the magnitude of the B vector whereby the ink carried by the ribbon 32 is maintained at a predetermined density.

Referring also to the sectional view of FIG. 4, individual terminals 90 of the set of terminals on one of the electrodes 28 are shown arranged in a linear array with a single conducting plate serving as an opposing terminal 92 which is positioned on the opposite electrode 28 in registration with the set of terminals 90 whereby electric fields from individual ones of the terminals of the lower one of the electrodes 28 are coupled through the paper 26 and the ribbon 32 to the terminal 92 of the upper one of the electrodes 28. Thereby, the deposition of ink particles from the ribbon 32 onto the paper 26 occurs at the paths of the individual ones of the electric fields and, accordingly, marks on the paper 26 are located at positions corresponding to such ones of the terminals 90 as are energized to provide the aforementioned fields. The degree of darkness to an individual mark, or gray scale thereof, depends on the magnitude of the electric field utilized in producing that particular mark. In addition, as has been noted hereinabove, the degree of the darkness of the mark on the paper 26 also depends on the density of the ink on the ribbon 32. However, since the ink density is regulated by the feeder 22 and the monitor 24 as explained hereinabove, the ink in the ribon 32 has a predetermined density so that the darkness of the marks on the paper 26 are dependent on the magnitudes of the individual ones of the electric fields between the individual terminals 90 and 92 utilized in producing the individual marks.

After the marks have been applied to the paper 26 in response to the electric fields are of the terminals 90, which electric fields are established by signals from the signal generator 30, the paper 26 with the marks thereon is passed by the rollers 36 and 40 over the roller 38 which is heated so as to melt the plastic binder of the ink particles whereupon the carbon constituent of the ink is brought into permanent adhesion with the paper by the melted thermoplastic material. In this way, the image produced by the electrodes 28 is made permanent.

It is understood that the above-described embodiment of the invention is illustrative only and that modifications thereof may occur to those skilled in the art. Accordingly, it is desired that hthis invention is not to be limited to the embodiment disclosed herein but is to be limited only as defined by the appended claims.

What is claimed is:

1. An ink feed system for ink having a magnetic constituent comprising:
   carrier means for transporting said ink;
   means positioned alongside said carrier means for directing a magnetic field in a plane parallel to a surface of said carrier means to secure said ink to said carrier means; and
   means positioned alongside said carrier means for detecting a component of a perturbation of said magnetic field normal to a surface of said carrier means, said perturbation being due to the presence of said ink, said detecting means signaling an amount of said ink being transported by said carrier means.

2. A system according to claim 1 further comprising means for metering said ink onto said carrier means, said metering means including means for impressing a magnetic field through said magnetic constituent to regulate a flow of said ink.

3. A system according to claim 2 wherein said detecting means is coupled to said metering means for signaling said metering means to supply a quantity of ink to said carrier means.

4. A system according to claim 3 wherein said metering means includes means for vibrating a passageway of said metering means through which said ink passes.

5. A system according to claim 3 wherein said detecting means comprises a Hall probe positioned within said magnetic field of said directing means for detecting said vertical component.

6. A system according to claim 5 wherein said carrier means comprises a ribbon.

7. A system according to claim 3 further comprising means for passing a recording medium adjacent said carrier means and means for electrically inducing a transport of said ink to said recording medium to provide an image thereon.

* * * * *

UNITED STATES PATENT OFFICE
CERTIFICATE OF CORRECTION

Patent No. 4,122,459    Dated Oct. 24, 1978

Inventor(s) Ernst F.R.A. Schloemann, Fred M. Howell

It is certified that error appears in the above-identified patent and that said Letters Patent are hereby corrected as shown below:

Column 2, line 11:  change "pressure" to - presence - ;

Column 2, line 14:  change "inke" to - ink - ;

Column 3, line 5:  change "unde" to - under - ;

Column 4, line 2:  change "vai" to - via - ;

Column 4, line 22:  change "th" to - the - ;

Signed and Sealed this

Fifth Day of June 1979

[SEAL]

Attest:

RUTH C. MASON
*Attesting Officer*

DONALD W. BANNER
*Commissioner of Patents and Trademarks*